United States Patent
Light et al.

(10) Patent No.: US 6,598,045 B2
(45) Date of Patent: Jul. 22, 2003

(54) SYSTEM AND METHOD FOR PIECEMEAL RELEVANCE EVALUATION

(75) Inventors: John J. Light, Hillsboro, OR (US); Milind S. Pandit, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/056,061

(22) Filed: Apr. 7, 1998

(65) Prior Publication Data

US 2001/0049684 A1 Dec. 6, 2001

(51) Int. Cl.$^7$ ................................. G06F 17/30
(52) U.S. Cl. .................... 707/5; 707/3; 707/6
(58) Field of Search .................. 707/1, 3, 5, 6, 707/513, 102; 715/513

(56) References Cited

U.S. PATENT DOCUMENTS

| | | | | |
|---|---|---|---|---|
| 4,247,906 A | * | 1/1981 | Corwin et al. | 707/530 |
| 5,638,543 A | * | 6/1997 | Pedersen et al. | 704/1 |
| 5,642,502 A | * | 6/1997 | Driscoll | 707/5 |
| 5,724,571 A | * | 3/1998 | Woods | 707/5 |
| 5,778,397 A | * | 7/1998 | Kupiec et al. | 715/500 |
| 5,794,178 A | * | 8/1998 | Caid et al. | 704/9 |
| 5,799,304 A | * | 8/1998 | Miller | 707/7 |
| 5,870,740 A | * | 2/1999 | Rose et al. | 707/5 |
| 5,892,842 A | * | 4/1999 | Bloomberg | 382/173 |
| 5,907,840 A | * | 5/1999 | Evans | 707/5 |
| 5,963,940 A | * | 10/1999 | Liddy et al. | 707/5 |
| 6,026,388 A | * | 2/2000 | Liddy et al. | 707/1 |
| 6,182,066 B1 | * | 1/2001 | Marques | 707/5 |
| 6,185,592 B1 | * | 2/2001 | Boguraev et al. | 715/531 |
| 6,339,437 B1 | * | 1/2002 | Nielsen | 345/787 |
| 6,389,436 B1 | * | 5/2002 | Chakrabarti et al. | 715/513 |

FOREIGN PATENT DOCUMENTS

| | | | | |
|---|---|---|---|---|
| EP | | 791883 A2 | * 2/1996 | G06F/17/30 |

OTHER PUBLICATIONS

Kwok, K. L., Experiments with a Component Theory of Probablistic Information Retrieval Based on Single Terms as Document Components, ACM Transaction On Information Systems, pp. 363–385. Oct. 1990.*

John J. Light, Inventor, Patent Application for *Method for Characterizing a Document Set Using Evaluation Surrogates*, File No. 042390.P3825, SM 132697.

John J. Light, Inventor, Patent Application for *Method for Recognizing Compound Terms in a Document*, File No. 042390.P3824, SM132698.

John J. Light, Inventor, Patent Application for *Method for Measuring Thresholded Relevance of a Document*, File No. 042390.P3826, SM 132699.

Marti A. Hearst, *TileBars: Visualization of Term Distribution Information in Full Text Information Access*, CHI'95 Mosaic of Creativity, May 7–11, 1995.

* cited by examiner

*Primary Examiner*—Hani M. Kazimi
*Assistant Examiner*—Ella Colbert
(74) *Attorney, Agent, or Firm*—Kenyon & Kenyon

(57) ABSTRACT

Systems and methods are introduced for evaluating the relevance of rich media material. A topic and a document are received, and the document is divided into various pieces. The relevance of each piece is evaluated with respect to the received topic, and these individual evaluations are combined in some way into a surrogate representation of the relevance.

25 Claims, 3 Drawing Sheets

SYSTEM AND METHOD FOR PIECEMEAL RELEVANCE EVALUATION

BACKGROUND OF THE INVENTION

The present invention relates to information retrieval. In particular, the present invention relates to evaluating the relevance of document transmissions that potentially consist of a variety of topics.

The primary purpose of the invention is to help people deal with information overload. With the increasing development of communications technology, it is possible for people to feel the opposing forces of being, on the one hand, highly dependent on critical information, and on the other hand, overloaded with information to the extent that there is a need to reduce exposure to the flood of information. As result of this conflict, people may find themselves in the position of needing to examine quickly large numbers of documents, with a significant penalty for missing critical information contained in those documents.

Various established tools exist for measuring the importance of documents to an individual. This technology, often referred to as relevance technology, allows a computer to make judgments about the importance to an individual of news articles, technical articles, mail messages or the like. This technology has proven useful for categorization and prioritization of presentation, both of which are necessary to help a user deal with a flood of information. But because of the inherent uncertainty of the relevance measure, the user who needs information prioritized still must spend time perusing many documents. Documents that are rated as highly relevant must be perused to see what, if any, useful information they contain. Documents that are rated as mildly relevant or less must be perused to make sure that nothing important is missed. Thus, nearly every article needs to be examined in some depth.

Existing relevance technology assumes that documents are homogeneous in content and relevance, and so a single relevance value is calculated for an entire document. This is because the technology was developed initially for relatively short documents such as wire-service items. As documents become longer and more varied in content, a single relevance value may be affected by separate sections of the document that contain references to unrelated topics, including some that are highly relevant and others of little or no interest to the user. This variability in content means that a single relevance number may result in either false-negative or false-positive evaluations. The only safe strategy for a reader of larger documents is to read most of the document, regardless of relevance evaluations.

Currently, either an entire document or a selected sub-set is evaluated for relevance. This can have the effect of causing the relevance to be misjudged. This misjudging of relevance can take various forms. For example, the relevance evaluation can be diluted if two unrelated sections of the document are evaluated together. This is because one section may be highly relevant while the other section contains material that results in a negative evaluation. In general, the user would want to be apprised of the relevant material, even when surrounded by irrelevant material. An example of this is the "What's News" section in the Wall Street Journal. This article typically contains several unrelated items that should, logically, be evaluated separately. For example, the first paragraph of the "What's News" section might focus on the topic "Endangered Species," while the second paragraph of the "What's News" section might focus on the topic "Gulf War Syndrome," and subsequent paragraphs might focus on topics entirely unrelated to any others. Therefore, while one might find the "Endangered Species" discussion highly relevant to one's needs, the entire document might not receive a high relevance value due to dilution from other topics.

In many cases, rather than evaluating the entire document, known relevance algorithms may evaluate only the first paragraph of each document. This is justified by the general understanding that news material is usually written in a particular style that insures that the relevant material is near the beginning of the document. Of course, this is not true of articles like "What's News." Therefore, again using "What's News" as an example, if only the first paragraph of a document is examined for relevance to "Endangered Species," then the document discussed above would receive a maximal relevance value even though only one paragraph discusses "Endangered Species." If only the first paragraph of the article discussed above is examined for relevance to "Gulf War Syndrome," the document will receive a minimal relevance value even though the article does, in fact, discuss this topic.

SUMMARY OF THE INVENTION

The present invention introduces systems and methods for evaluating the relevance of transmitted data. In one embodiment of the present invention, a topic and a document are received, and the document is divided into various pieces. The relevance of each piece is evaluated with respect to the received topic, and these individual evaluations are combined into a surrogate representation of the relevance.

DETAILED DESCRIPTION OF THE INVENTION

Embodiments of the present invention evaluate the relevance of rich media materials. In particular, embodiments of the present invention are directed to a method and apparatus for describing and displaying documents in terms of relevance to a certain topic. The prior art determines relevance by evaluating an entire document as a homogeneous unit. Embodiments of the present invention, on the other hand, evaluate relevance of a document on a piece-by-piece bases.

Figure 1:
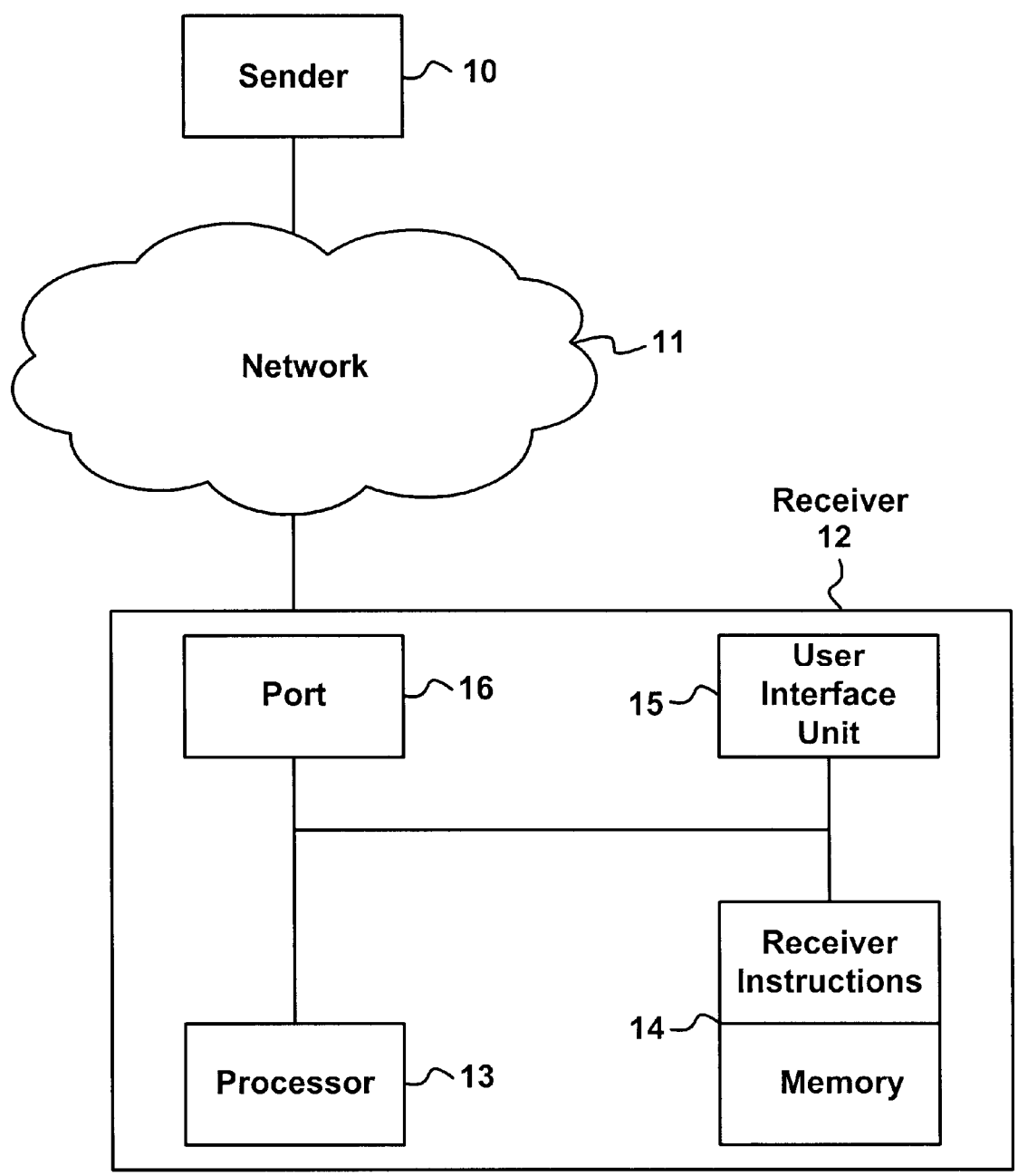
FIG. 1 illustrates a system overview of an embodiment of the present invention.

Referring now in detail to the drawings, FIG. 1 illustrates a system overview of an embodiment of the present invention. As a context for the present invention, but not the only context, consider sender 10 to be a news service that sends continuous news broadcasts through network 11 and received at receiver 12 through port 16. In this context, network 11 can be the internet, and receiver 12 can be a desktop computer. A user using receiver 12 may desire to filter the broadcast for relevance to topics of interest to the user. To do this, the broadcast is filtered for relevance by processor 13, using instructions stored for just such a purpose in memory 14. After processing, the broadcast information with the requisite degree of relevance can be provided in some form on user interface unit 15, such as a monitor display.

Figure 2:
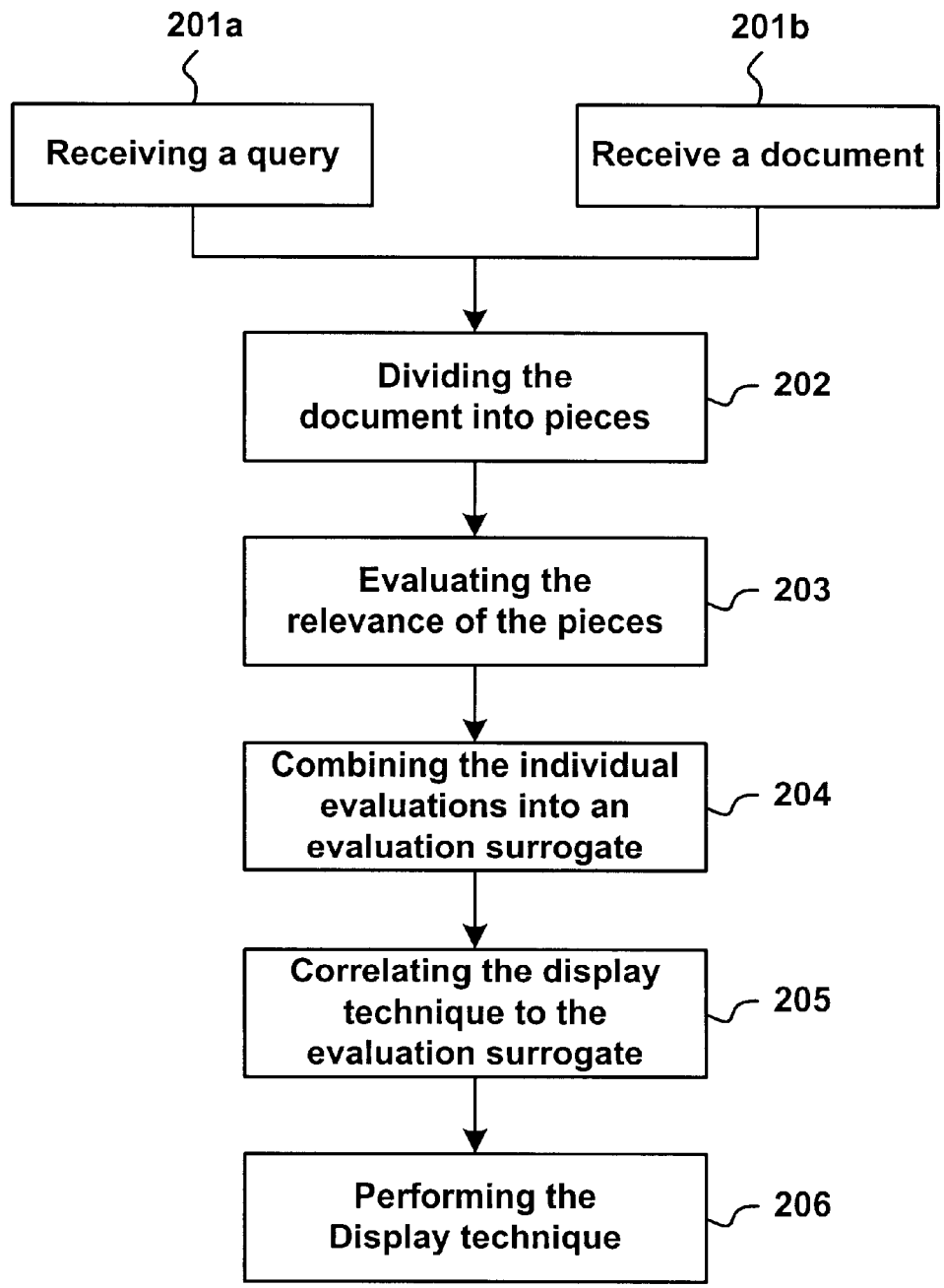
FIG. 2 is a flow chart illustrating an embodiment of a method according to the present invention.

FIG. 2 is an embodiment of a method in accordance with the present invention. A query and document are received for comparison at step 201a and 201b, respectively. The query is typically a topic of interest to a user, and the document's relevance is determined with respect to this query. For the purposes of this invention, the word "received" includes, but is not limited to, "created" and "selected."

At step 202, the document is divided into a plurality of pieces and some subset of the plurality of pieces is evaluated. For the purposes of the present invention, the subset of the plurality of pieces ranges from all the pieces (the complete set) to none of the pieces (the null set). In one embodiment of the present invention, the document is divided into pieces based on natural divisions in the document. Examples of natural boundaries include, but are not limited to, paragraphs, sentences, chapters, etc. In another embodiment of the present invention, the document is divided up along arbitrarily-selected boundaries. For the purpose of this invention, "arbitrarily-selected boundaries" means not according to natural boundaries. One example of dividing the document along arbitrarily-selected boundaries occurs when the document is divided into fixed fractions of the document. Another example of dividing the document along arbitrarily-selected boundaries occurs when the document is divided into fixed amounts of text.

In one embodiment of the present invention, the arbitrarily-divided document is divided for evaluation according to the user's wishes. For example, the relevance evaluation will be performed on text that is highlighted by the user. In another embodiment of the present invention, the arbitrarily-divided document is divided for evaluation according to view-screen size. For example, a relevance evaluation will be performed on text that is presently being viewed by the user.

At step 203, the relevance of pieces are evaluated with respect to the query. This relevance determination can be performed in any known way using any known algorithm, either currently known or later developed, possibly treating each piece as a distinct document. For example, in one embodiment of the present invention, if the document is arbitrarily divided into a user-highlighted portion and a non-highlighted portion as discussed above, then the relevance evaluation is performed only with respect to the user-highlighted portion. In another embodiment of the present invention, if the document is arbitrarily divided into a portion presently viewed and a portion not presently viewed as discussed above, then the relevance evaluation is performed only with respect to the portion of the document presently being viewed.

At step 204, the individual evaluations are combined into an evaluation surrogate. An evaluation surrogate is a number-based representation of a document's relevance with respect to a query. In one embodiment of the present invention, a surrogate is an evaluation vector in which each entry in the vector represents the evaluation of a piece of the document. A surrogate does not have to have a multidimensional form. For example, in one embodiment of the present invention, the surrogate is the single highest value of all the evaluations for a document. A surrogate can even take graphical form, where the height of the graph, for example, represents the document's, or its individual pieces', evaluations.

Figure 3:
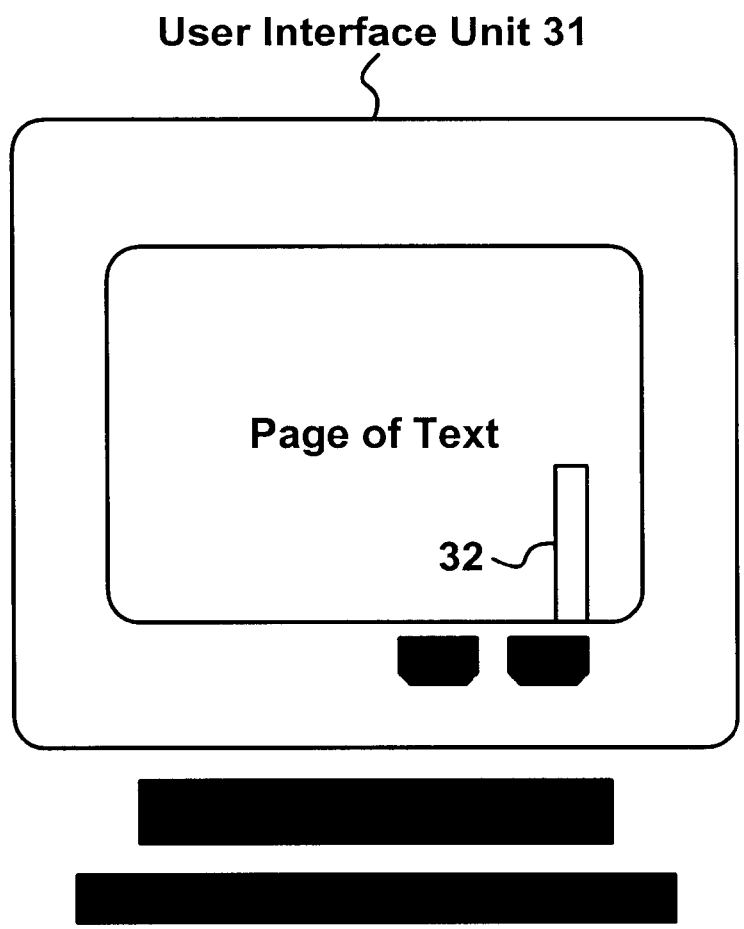
FIG. 3 is a pictorial representation of one embodiment of the present invention.

After the surrogate is created, some action can be taken. For example, referring to FIG. 1, in one embodiment of the present invention, the entire document can be transmitted with a surrogate from sender 10 to receiver 12; in another embodiment of the present invention, pieces of the document can be transmitted along with the surrogate from sender 10 to receiver 12. In other embodiments of the present invention, in addition to transmission, the document can be displayed or stored according to its relevance on display 15 or memory 14, respectively. Referring now to FIG. 2, at step 205 a display technique is correlated to the evaluation surrogate, and at step 206 the display technique is performed. In one embodiment of the present invention, a display technique comprises displaying the document and displaying a static graph of the relevance of each piece of the document along with the document. For example, a display technique takes the form of a graph or histogram of relevance versus position in the document. In other words, the height of the histogram corresponds to the results of a relevance evaluation of a particular piece of the document. FIG. 3 is a pictorial representation of one embodiment of the present invention. In this embodiment, user-interface unit 31 contains the text of a particular piece of the document. Histogram 32 represents relevance versus position in the document and is displayed next to the document such that each entry in the histogram is displayed next to its corresponding portion of the document.

In another embodiment of the present invention, the display technique correlated to the evaluation surrogate at step 205 involves an audible alarm. At step 206, this display technique is performed by playing the alarm when a relevant portion of the document is displayed. In one embodiment of the present invention, a threshold relevance is set such that the audible alarm is played when a portion of the document having a relevance above the threshold is displayed.

In one embodiment of the present invention, the display technique correlated to the evaluation surrogate at step 205 is a dynamic indicator of relevance. At step 206, this display technique is performed by varying the height or strength of a visual or aural indicator as the various portions of the document scroll past a viewer. In one embodiment of the present invention, the dynamic indicator of relevance is an audible alarm with increasing or decreasing volume depending on the relevance of the portion displayed. In another embodiment of the present invention, the dynamic indicator of relevance is an audible alarm that increases in pitch as the displayed portions of the document become more relevant, and decreases in pitch as the displayed portions of the document become less relevant.

In one embodiment of the present invention, the dynamic indicator of relevance is a visual representation of relevance that grows visually as the displayed portions of the document become more relevant, and shrinks visually as the displayed portions of the document become less relevant.

In one embodiment of the present invention, various steps are performed by whatever software or hardware tool is being used to read the document. In another embodiment of the present invention, the invention will examine the piece of document content that is visible to the user at each moment. The visible content is evaluated for relevance to determine the user's interest in it. This evaluation is performed in parallel to the user's reading of the document.

FIG. 1 illustrates components of receiver 12 according to an embodiment of the present invention. The apparatus consists of a processor 13, a port 16 coupled to processor 13 through which digital data in some format is received, and memory 14, also coupled to processor 13. In one embodiment of the present invention, memory 14 stores instructions adapted to be executed by the processor to receive a topic and a document, divide the document into pieces, evaluate the pieces' relevance, and then combine the individual relevance evaluations into an evaluation surrogate.

In another embodiment of the present invention, memory 14 stores instructions to be run on processor 13 to receive an evaluation surrogate, correlate a display technique to the evaluation surrogate, and them perform the display technique on display 15. As an example, but not the only example, memory 14 stores instructions adapted to be run on processor 13 to receive, create, or select some relevance representation like an evaluation vector, and then display on display 15 a static graph, or histogram, of the relevance of each piece of the document along with the document. In another embodiment of the present invention, the display technique comprises a dynamic indicator of relevance. As an example, this dynamic indicator of relevance can take the form of some visual representation of relevance like a single bar whose height changes on the display according what portion of the document is being viewed. In another embodiment of the present invention, the display technique comprises sounding an audible alarm when the relevant portions of the document are viewed.

For the purposes of this application, memory includes any medium capable of storing instructions adapted to be executed by a processor. Some examples of such media include, but are not limited to, floppy disks, CDROM, magnetic tape, hard drives, and any other device that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method for evaluating the relevance of a document, comprising:
   a. receiving a query;
   b. receiving a document;
   c. dividing the document into a plurality of pieces according to natural boundaries;
   d. evaluating the relevance of each piece contained in a subset of the plurality of pieces with respect to that query; and
   e. creating an evaluation surrogate based upon the result of the evaluation of step d;
   f. examining the document for features that represent natural boundaries.

2. The method according to claim 1, wherein the surrogate comprises a vector based on the relevance of each piece of the document.

3. The method according to claim 1, wherein the surrogate is the maximal relevance value of the individual pieces.

4. The method of claim 1, further comprising:
   g. correlating a display technique to the evaluation surrogate; and
   h. performing the display technique.

5. The method in claim 4, wherein said correlating operation further comprises:
   (i) displaying the document; and
   (ii) displaying a static graph of the relevance of each piece of the document along with the document.

6. The method in claim 4, wherein said correlating operation further comprises:
   (i) displaying the document; and
   (ii) displaying a dynamic indicator of relevance.

7. The method in claim 4, wherein said correlating operation further comprises:
   (i) displaying the document; and
   (ii) sounding an audible alarm when relevant portions of the document are viewed.

8. An apparatus for evaluating the relevance of documents comprising:
   a. a processor;
   b. a port coupled to said processor; and
   c. a memory coupled to said processor storing instructions adapted to be executed by said processor to:
      (i) receive a query;
      (ii) receive a document;
      (iii) divide the document into a plurality of pieces;
      (iv) evaluate the relevance of each piece from a subset of the plurality of pieces with respect to that query; and
      (v) combine the individual evaluations into an evaluation surrogate;
      (vi) examine the document for features that represent natural boundaries.

9. The apparatus in claim 8, wherein the surrogate comprises a vector based on the relevance of each piece of the document.

10. The apparatus in claim 8, wherein the surrogate is the maximal relevance value of all the pieces.

11. The apparatus of claim 8, said memory further storing instructions adapted to be executed by said processor to
    (vi) divide the documents according to natural boundaries.

12. The apparatus of claim 8, said memory further storing instructions adapted to be executed by said processor to
    (vi) receive a command as to how to divide the document.

13. A computer readable medium that stores instructions adapted to be executed by a processor to perform a method, the method comprising:
    a. receiving a query;
    b. receiving a document;
    c. dividing the document into a plurality of pieces according to natural boundaries;
    d. evaluating the relevance of each piece from a subset of the plurality of pieces with respect to that query;
    e. combining the individual evaluations into an evaluation surrogate.

14. The computer readable medium according to claim 13, wherein the surrogate comprises a vector based on the relevance of each piece of the document.

15. The computer readable medium according to claim 13, wherein the surrogate is the maximal relevance value of all the pieces.

16. The computer readable medium of claim 13, the method further comprising:
    f. correlating a display technique to the evaluation surrogate;
    g. performing the display technique.

17. The computer readable medium of claim 16, the method further comprising:

h. displaying the document; and i. displaying a static graph of the relevance of each piece of the document along with the document.

18. The computer readable medium of claim 16, the method further comprising:

h. displaying the document; and i. displaying a dynamic indicator of relevance.

19. A method for evaluating the relevance of a document, comprising:

a. receiving a query;

b. receiving a document;

c. examining the document for features that represent natural boundaries, natural boundaries being selected from a group consisting of chapters, pages, paragraphs, and sentences;

d. dividing the document into a plurality of pieces according to natural boundaries;

e. evaluating a relevance of each piece contained in the plurality of pieces with respect to that query; and f. creating an evaluation surrogate based upon the relevance of the plurality of pieces.

20. The method of claim 19, wherein the evaluation surrogate comprises a vector based on the relevance of each piece of the document.

21. The method of claim 19, wherein the evaluation surrogate is the maximal relevance value of the individual pieces.

22. The method of claim 19, further comprising:

g. correlating a display technique to the evaluation surrogate; and h. performing the display technique.

23. The method of claim 22, wherein correlating the display technique further comprises:

(i) displaying the document; and (ii) displaying a static graph of the relevance of each piece of the document along with the document.

24. The method of claim 22, wherein correlating the display technique further comprises:

(i) displaying the document; and (ii) displaying a dynamic indicator of relevance.

25. The method of claim 22, wherein correlating the display technique further comprises:

(i) displaying the document; and (ii) sounding an audible alarm when relevant portions of the document are viewed.

* * * * *